United States Patent Office 3,320,248
Patented May 16, 1967

3,320,248
ADAMANTANE CARBOXYLIC ACID ESTERS OF PHENOTHIAZINE
Jack Bernstein, New Brunswick, N.J., assignor to Olin Mathieson Chemical Corporation, New York, N.Y., a corporation of Virginia
No Drawing. Filed July 9, 1965, Ser. No. 470,877
6 Claims. (Cl. 260—243)

This invention relates to new acid esters of phenothiazines having valuable therapeutic properties, pharmaceutical compositions containing the same, and processes for the preparation thereof.

The therapeutically active compounds of this invention include phenothiazines of the general Formula I and acid addition salts thereof:

(I) 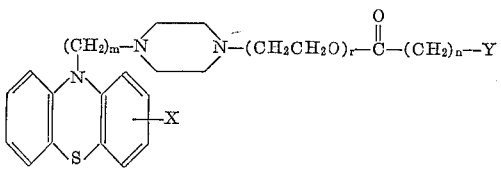

wherein $m$ is 2 to 7 preferably 3, $n$ is 0, 1 or 2; $r$ is 1 or 2, X is hydrogen, halogen (preferably chloro), trifluoromethyl, lower alkyl, lower alkoxy, lower alkanoyl, lower alkyl mercapto, trifluoromethylmercapto, lower alkylsulfonyl (preferably methylsulfonyl), and di-lower alkylsulfamyl (preferably dimethylsulfamyl); Y is adamantyl 3-R-5-R¹-adamantyl, R and R¹ each is hydrogen, halogen, lower alkyl, lower alkoxy or phenyl.

The preferred compounds of this invention are those wherein X is chloro or trifluoromethyl, especially in the 2-position, Y is adamantyl, $m$ is 3, $n$ is 0 and $r$ is 1.

Since the compounds of this invention are especially adapted for parenteral administration, as more fully discussed hereinafter, they are preferably administered in the form of their free esters. The compounds, however, readily form acid-addition salts, which may be utilized in the preparation of the free esters or the purification thereof and can also be used for parenteral formulations. Acids useful for preparing the acid-addition salts include, inter alia, inorganic acids such as the hydrohalic acids (e.g. hydrochloric and hydrobromic acid), sulfuric acid, nitric acid and phosphoric acid, and organic acids such as oxalic, tartaric, citric, pamoic, fumaric, acetic, maleic, and succinic acid.

The compounds of this invention are therapeutically active substances which are utilizable as tranquilizing (or ataractic) and antiemetic agents. These compounds differ from the free hydroxyl derivatives in that they are significantly longer acting when administered perenterally and thus, when injected subcutaneously or intramuscularly, for example, in a suitable vehicle, yield a long acting tranquilizing or antiemitic drug.

The compounds of this invention can be prepared by interacting a compound of the general Formula (II):

(II) 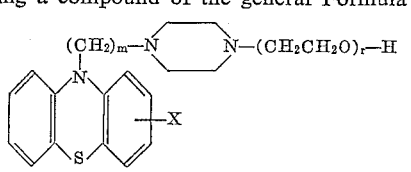

wherein X, $m$ and $r$ are as hereinbefore defined, with an adamantyl acyl halide (preferably acyl chloride) of the formula Y—(CH₂)ₙ—CO—halide wherein Y and $m$ are as hereinbefore defined, the reaction preferably being conducted in an organic solvent, such as chloroform, for the reactants. Among the suitable phenothiazine reactants may be mentioned:

10-[3-(2-hydroxyethyl)piperazinopropyl]phenothiazine;
10-[3-(2-hydroxyethyl)piperazinopropyl]-2-halophenothiazines, such as
10-[3-(2-hydroxyethyl)piperazinopropyl]2-chlorophenothiazine;
10-[3-(2-hydroxyethyl)piperazinopropyl]-2-trifluoromethylphenothiazine;
10-[3-(2-hydroxyalkoxyalkyl)piperazinopropyl]-2-halo-phenothiazines, such as
10-[3-(2-hydroxyethoxyethyl)piperazinopropyl]-2-trifluoromethylphenothiazine;
10-[3-(2-hydroxyethyl)piperazinopropyl]-2-(lower alkyl)phenothiazines, such as
10-[3-(2-hydroxyethyl)piperazinopropyl]-2-methylphenothiazine;
10-[3-(2-hydroxyethyl)piperazinopropyl]-2-(lower alkoxy)phenothiazines, such as
10-[3-(2-hydroxyethyl)piperazinopropyl]-2-methoxyphenothiazine;
10-[3-(2-hydroxyethyl)piperazinopropyl]-2-(lower alkanoyl)phenothiazines, such as
10-[3-(2-hydroxyethyl)piperazinopropyl]-2-propionylphenothiazine;
10-[3-(2-hydroxyethyl)piperazinopropyl]-2-(lower alkyl mercapto)-phenothiazines, such as
10-[3-(2-hydroxyethyl)piperazinopropyl]-2-methylmercaptophenothiazine;
10-[3-(2-hydroxyethyl)piperazinopropyl]-2-trifluoromethylmercaptophenothiazine and
10-[(2-hydroxyethyl)piperazinopropyl]-2-methylsulfonylphenothiazine.

Among the suitable acyl halide reactants may be mentioned the 1-adamantanecarboxyl acid chlorides such as 1-adamantanecarboxylic acid chloride,
3-methyl-1-adamantanecarboxylic acid chloride,
3-fluoro-1-adamantanecarboxylic acid chloride,
3-chloro-1-adamantanecarboxylic acid chloride,
3-bromo-1-adamantanecarboxylic acid chloride,
3-iodo-1-adamantanecarboxylic acid chloride,
3-methoxy-1-adamantanecarboxylic acid chloride,
3-phenyl-1-adamantanecarboxylic acid chloride,
3,5-dimethyl-1-adamantanecarboxylic acid chloride,
2-adamantanecarboxylic acid chloride,
1-adamantylacetyl chloride, and
2(1-adamantyl)propionyl chloride.

All of the acyl halides described hereinbefore may be prepared by heating an acid of the formula

Y—(CH₂)ₙ—COOH wherein Y and $n$ are as hereinbefore defined, with two parts by weight, of a thionyl halide, preferably thionyl chloride or thionyl bromide, alone, or in the presence of an anhydrous solvent, such as chloroform or benzene, under reflux for a period of up to three hours, concentrating to remove the excess thionyl halide (and any solvent present), and then distilling or recrystallizing to obtain the resultant acyl halide, Y—(CH₂)ₙ—CO—halide, wherein Y and $n$ are as hereinbefore defined.

The free bases, when initially formed, can be converted to acid-addition salts by treatment with the desired acid. This reaction is preferably conducted in an inert organic solvent under substantially anhydrous conditions by treating the base with the acid, whereby the acid-addition salt is formed.

To prepare the preferred compositions of this invention, the compounds of this invention, in the form of their free basic esters or acid addition salts, are dissolved or suspended in a parenterally acceptable liquid vehicle. For prolonged action, the compounds are formulated in an oil such as peanut oil, sesame oil, cottonseed oil, corn oil, soybean oil, synthetic glycerol esters of long chain fatty acids, and mixtures of these and other oils; the compound preferably being present in a concentration to give about 20 mg. to about 300 mg. of the compound per ml. The preferable route of administration of these formulations is subcutaneously or intramuscularly.

The following examples illustrate the invention (all temperatures being in centigrade).

EXAMPLE 1

*1-adamantanecarboxylic acid chloride*

A mixture of 10 grams of 1-adamantanecarboxylic acid and 20 ml. of thionyl chloride is heated under reflux for thirty minutes. The excess thionyl chloride is removed by distillation under reduced pressure. Ten ml. of anhydrous benzene is added to the residue and the solvent is removed by distillation under reduced pressure. The residue crystallizes to a solid mass and is used without further purification.

EXAMPLE 2

*1-adamantanecarboxylic acid ester of 10-{3-[4-(2-hydroxyethyl)-piperazino]propyl} - 2 - (trifluoromethyl)phenothiazine*

A.—PREPARATION OF THE 1 - ADAMANTANECARBOXYLIC ACID ESTER OF 10-{3-[4-(2-HYDROXYETHYL) PIPERAZINO]PROPYL} - 2 - TRIFLUOROMETHYLPHENOTHIAZINE, DIHYDROCHLORIDE

To a stirred solution of 30.6 g. of 10-{3-[4-(2-hydroxyethyl)piperazino]propyl} - 2-trifluoromethylphenothiazine in 300 ml. of dry chloroform is added, dropwise, 16 g. of 1-adamantanecarboxylic acid chloride in 50 ml. of dry chloroform. Subsequently, the reaction mixture is stirred and heated under reflux for five hours, cooled, and shaken with 5% aqueous hydrochloric acid. The dried chloroform solution is concentrated to about 50 ml., cooled and diluted with about 450 ml. of anhydrous ether. To this cooled solution is added about 10 ml. of ethereal hydrogen chloride. The cooled mixture is filtered and the solid crystallized from absolute ethanol and ether to give the product.

B.—PREPARATION OF THE 1 - ADAMANTANECARBOXYLIC ACID ESTER OF 10-{3-[4-(2-HYDROXYETHYL) PIPERAZINO]PROPYL} - 2 - TRIFLUOROPHENOTHIAZINE

An ice-cooled mixture of the dihydrochloride obtained in step (A), 500 ml. of 5% aqueous potassium carbonate solution and 1000 ml. of ether are stirred until all the solid has reacted. The ether layer is separated, dried and concentrated to give about 18.0 g. of product as a viscous pale yellow oil.

Similarly, by substituting an equivalent amount of the following R-substituted-1-adamantanecarboxylic acid chlorides for the 1-adamantanecarboxylic acid chloride in step (A) of Example 2, and following the procedures of steps (A) and (B) the indicated ester is obtained.

| R-substituent | Ester |
| --- | --- |
| 3-methyl | 3-methyl-1-adamantanecarboxylic. |
| 3-fluoro | 3-fluoro-1-adamantanecarboxylic. |
| 3-chloro | 3-chloro-1-adamantanecarboxylic. |
| 3-bromo | 3-bromo-1-adamantanecarboxylic. |
| 3-iodo | 3-iodo-1-adamantanecarboxylic. |
| 3-methoxy | 3-methoxy-1-adamantanecarboxylic. |
| 3-phenyl | 3-phenyl-1-adamantanecarboxylic. |
| 3,5 dimethyl | 3,5-dimethyl-1-adamantanecarboxylic. |

EXAMPLE 3

*2 - adamantanecarboxylic acid ester of 10 - {3 - [4 - (2-hydroxyethyl) - piperazino]propyl} - 2 - trifluoromethylphenothiazine*

To 89.3 g. of 10-[3-(2-hydroxyethyl)piperazinopropyl]-2-trifluoromethylphenothiazine in one liter of dry chloroform is added, dropwise, 50 g. of 2-adamantanecarboxylic acid chloride in 100 ml. of dry chloroform. The mixture is then refluxed for two hours and concentrated until free of chloroform. The residual oil is added to a suspension of 40 g. of sodium bicarbonate in 400 ml. of ice water and 500 ml. of ether. The mixture is shaken carefully until no further evolution of carbon dioxide occurs, the ether layer is separated, dried and concentrated to give 2-adamantanecarboxylic acid ester of 10 - {3 - [4 - (2-hydroxyethyl)-piperazino]propyl}-2-trifluoromethylphenothiazine as a pale yellow oil.

EXAMPLE 4

*2-adamantanecarboxylic acid ester of 10-{3-[4-(2-hydroxyethyl) - piperazino]propyl}-2-trifluoromethylphenathiazine, salt with 2 moles of maleic acid*

12.5 g. of the product obtained in Example 2 (B) is dissolved in 50 ml. of dry chloroform, the solution is cooled, and a saturated solution of 4.46 g. of maleic acid in dry acetone is added dropwise. The precipitated solid is filtered and recrystallized from dry acetone to give the 2-adamantanecarboxylic acid ester of 10-{3-[4-(2-hydroxyethyl)piperazino]propyl} - 2 - trifluoromethylphenothiazine, salt with two moles of maleic acid.

EXAMPLE 5

*1-adamantylacetic acid ester of 10-{3-[4-(2-hydroxyethyl) piperazino]propyl}-2-(trifluoromethyl)phenothiazine*

Following the procedure set forth in Example 3 but substituting 53 grams of 1-adamantylacetyl chloride for the 1-adamantanecarboxylic acid chloride there is obtained the 1-adamantylacetic acid ester of 10-{3-[4-(2-hydroxyethyl)piperazino]propyl}-2-(trifluoromethyl) - phenothiazine.

EXAMPLE 6

*3-(1-adamantyl)propionic acid ester of 10-{3-[4-(2 - hydroxyethyl)-piperazino]propyl} - 2 - (trifluoromethyl)-phenothiazine*

A.—3-(1-ADAMANTYL)PROPIONIC ACID

To a solution of 20.4 grams of 3-(1-adamantyl)propiolic acid in 150 ml. of glacial acetic acid there is added 0.5 grams of platinum oxide catalyst and the mixture is shaken in a Parr hydrogenation apparatus in an atmosphere of hydrogen at an initial pressure of 50 lb. per sq. in. The mixture is shaken until the calculated amount of hydrogen is taken up. The catalyst is filtered and the filtrate concentrated under reduced pressure to yield the desired 3-(1-adamantyl)propionic acid.

B.—3-(1-ADAMANTYL)PROPIONYL CHLORIDE

Following the procedure of Example 1 but substituting 3-(1-adamantyl)propionic acid for the 1-adamantanecarboxylic acid there is obtained 3-(1-adamantyl)propionyl chloride.

C.—3-(1-ADAMANTYLPROPIONIC ACID ESTER OF 10-{3-[4-(2-HYDROXYETHYL)PIPERAZINO]PROPYL}-2-(TRIFLUOROMETHYL)PHENOTHIAZINE

Following the procedure of Example 2 but substituting an equivalent amount of 3-(1-adamantyl)propionyl chloride for 1-adamantanecarboxylic acid chloride there is obtained the 3-(1-adamantyl)propionic acid ester of 10-{3-[4 - (2 - hydroxyethyl)piperazino]propyl} - 2 - (trifluoromethyl)phenothiazine.

EXAMPLE 7

*1-adamantanecarboxylic acid ester of 10-{3 - [4 - (2 - hydroxyethoxyethyl)piperazino]propyl} - 2 - (trifluoromethyl)phenothiazine*

Following the procedure of Example 2 but substituting an equivalent amount of 10-{3-[4-(2-hydroxyethoxyethyl)piperazino]propyl}-2 - (trifluoromethyl)phenothiazine for the 10-{3-[4-(2-hydroxyethyl)piperazino]propyl}-2-(trifluoromethyl)phenothiazine there is obtained the 1-adamantanecarboxylic acid ester of 10-{3 - [4 - (2 - hydroxyethoxyethyl)piperazino]propyl} - 2 - (trifluoromethyl)phenothiazine.

Similarly by substituting the 10-{3-[4-(2-hydroxyethyl)piperazino]propyl} derivatives of the following 2-R³-substituted phenothiazines, the corresponding 1-adamantanecarboxylic acid esters of the 10-{3-[4-(2-hydroxyethyl)piperazino]propyl} - 2 - R³ - phenothiazines are obtained.

| 2-R³-substituted phenothiazine | 2-R³-substituted phenothiazine ester |
|---|---|
| 2-chloro | 2-chloro. |
| 2-methyl | 2-methyl. |
| 2-tertiaryl butyl | 2-tertiaryl butyl. |
| 2-methoxy | 2-methoxy. |
| 2-acetyl | 2-acetyl. |
| 2-propionyl | 2-propionyl. |
| 2-methylmercapto | 2-methylmercapto. |
| 2-methylsuflonyl | 2-methylsulfonyl. |
| 2-dimethylsulfamyl | 2-dimethylsulfamyl. |
| 2-trifluoromethylmercapto | 2-trifluoromethylmercapto. |

EXAMPLE 8

*Parenteral formulation A*

50 g. of the 1-adamantanecarboxylic acid ester of 10-[3-(2-hydroxyethyl)piperazinopropyl] - 2 - trifluoromethylphenothiazine obtained as in Example 2 is dissolved in 1000 ml. of sesame oil, U.S.P. The solution is sterile filtered and packaged aseptically for parenteral administration.

EXAMPLE 9

*Parenteral formulation B*

A suspension of 56 g. of micronized 1-adamantanecarboxylic acid ester of 10-[3-(2-hydroxyethyl)piperazinopropyl]-2-trifluoromethylphenothiazine, dihydrochloride, prepared as in Example 2, 0.36 g. of lecithin, N.F., 0.18 g. of Tween 80 and 1.68 g. of aluminum monostearate (purified), diluted to 1000 ml. with sesame oil is prepared under sterile conditions and packaged aseptically for parenteral administration.

EXAMPLE 10

*Parenteral formulation C*

A solution of 50 g. of the 1-adamantanecarboxylic acid ester of 10-[3-(2-hydroxyethyl)piperazinopropyl]-2 - trifluoromethylphenothiazine, 1.5 g. aluminum monostearate (purified), diluted to 1000 ml. with sesame oil, U.S.P., is sterile filtered and packaged aseptically for parenteral administration.

This invention may be variously otherwise embodied within the scope of the appended claims.

What is claimed is:

1. A member selected from the group consisting of a compound of the formula

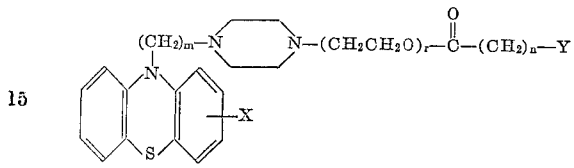

wherein X is selected from the group consisting of hydrogen, halogen, trifluoromethyl, lower alkyl, lower alkoxy, lower alkanoyl, lower alkyl mercapto, trifluoromethylmercapto, lower alkylsulfonyl, and di-lower alkylsulfamyl; $m$ is an integer from 2 to 7, $n$ is an integer from 0 to 2, $r$ is 1 or 2, Y is selected from the group consisting of adamantyl and 3-R-5-R¹-adamantyl wherein R and R¹ is a member of the group consisting of halogen, lower alkyl, lower alkoxy or phenyl, and a pharmaceutically acceptable acid-addition salt thereof.

2. The ester of 10-[3-(2-hydroxyethyl)piperazinopropyl]-2 - trifluoromethylphenothiazine and 1 - adamantanecarboxylic acid.

3. The ester of 10-[3-(2-hydroxyethyl)piperazinopropyl]-2-trifluoromethylphenothiazine and 1-adamantylacetic acid.

4. The ester of 10-[3-(2-hydroxyethyl)piperazinopropyl]-2-chlorophenothiazine and 1-adamantanecarboxylic acid.

5. The ester of 10-[3-(2-hydroxyethyl)piperazinopropyl]-2-chlorophenothiazine and 1-adamantylacetic acid.

6. The compound of claim 1, wherein the X is in the 2-position.

No references cited.

WALTER A. MODANCE, *Primary Examiner.*

HARRY I. MOATZ, *Assistant Examiner.*